US006348799B1

(12) United States Patent
Herweg et al.

(10) Patent No.: US 6,348,799 B1
(45) Date of Patent: Feb. 19, 2002

(54) METHOD FOR DETERMINING THE ION COMPONENT FOLLOWING A COMBUSTION PROCESS IN A SELF-IGNITING INTERNAL COMBUSTION ENGINE

(75) Inventors: Ruediger Herweg, Esslingen; Peter Hohner, Leinfelden-Echterdingen; Rudolf Maly, Sindelfingen; Gregor Renner, Stuttgart; Hartung Wilstermann, Gaildorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/382,191

(22) Filed: Aug. 23, 1999

(30) Foreign Application Priority Data

Aug. 22, 1998 (DE) ........................................ 198 38 223

(51) Int. Cl.7 .......................... G01N 27/62; G01L 23/22
(52) U.S. Cl. ....................... 324/464; 324/459; 73/35.08
(58) Field of Search ................................ 324/459, 464, 324/466; 73/35.08, 116, 118; 123/146 A; 392/321, 322, 323

(56) References Cited

U.S. PATENT DOCUMENTS

| | | | | | |
|---|---|---|---|---|---|
| 4,377,140 A | | 3/1983 | Latsch | | |
| 4,389,373 A | * | 6/1983 | Linder et al. | | 324/465 |
| 4,404,524 A | * | 9/1983 | Yamamoto et al. | | 324/459 |
| 4,456,883 A | * | 6/1984 | Bullis et al. | | 324/459 |
| 4,463,729 A | | 8/1984 | Bullis et al. | | |
| 4,648,367 A | * | 3/1987 | Gillbrand et al. | | 73/35.08 |
| 4,739,731 A | * | 4/1988 | Habich et al. | | 123/425 |
| 5,461,902 A | * | 10/1995 | Iwata | | 73/116 |
| 6,091,244 A | * | 7/2000 | Rottler | | 324/459 |
| 6,104,195 A | * | 8/2000 | Yoshinaga et al. | | 324/459 |
| 6,222,367 B1 | * | 4/2001 | Shimizu et al. | | 324/459 |

FOREIGN PATENT DOCUMENTS

| | | |
|---|---|---|
| DE | 34 28 371 | 2/1986 |
| DE | 197 20 532 | 1/1999 |
| EP | 0 190 206 | 8/1986 |
| EP | 0 801 294 | 10/1997 |
| WO | WO 86/00961 | 2/1996 |

* cited by examiner

*Primary Examiner*—Safet Metjahic
*Assistant Examiner*—Jermele M. Hollington
(74) *Attorney, Agent, or Firm*—Crowell & Moring LLP

(57) ABSTRACT

A method is provided for determining the ion component following a combustion process in a self-igniting internal combustion engine. At least two electrodes are located inside at least one cylinder, to which electrodes an electrical voltage can be applied, with the voltage being an AC voltage or having an AC voltage component.

4 Claims, 2 Drawing Sheets

METHOD FOR DETERMINING THE ION COMPONENT FOLLOWING A COMBUSTION PROCESS IN A SELF-IGNITING INTERNAL COMBUSTION ENGINE

BACKGROUND AND SUMMARY OF THE INVENTION

This application claims the priority of German Application No. 198 38 223.5, filed Aug. 22, 1998, the disclosure of which is expressly incorporated by reference herein. The present invention relates to a method for determining the ion component following a combustion process in a self-igniting internal combustion engine.

A method for determining the ion component is already known from WO 86/00961, in which the ion current in a diesel engine is measured using a DC voltage. For this purpose, a modified glow plug is introduced into the combustion chamber of the cylinder in which an ion current measurement is to be performed. On its tip projecting into the combustion chamber, the modified glow plug has an electrically conducting layer connected to an electrical printed conductor that terminates in an external connection for electrical contact. The ion current is measured by charging the tip of the glow plug to a DC potential of 250 volts relative to the ground potential of the combustion chamber wall. Therefore, the tip of the glow plug forms one electrode while the combustion chamber wall, which is at ground potential, forms the other electrode.

On the other hand, the goal of the present invention is to propose a method for determining the ion component following a combustion process in a self-igniting internal combustion engine, by which the measurement of the ion current in a self-igniting internal combustion engine is improved upon.

This goal is achieved according to the invention by a method for determining the ion component following a combustion process in a self-igniting internal combustion engine, in which two electrodes are located inside at least one cylinder, to which electrodes an electrical voltage can be applied, characterized in that the voltage is an AC voltage.

Applicants' previously filed German patent application (filed May 16, 1997 at the German Patent Office and with official file no. P . . . ) performs an ion current measurement in a four-cycle engine using a spark plug as a measurement probe, with this spark plug being charged with an alternating voltage. Since in that case the noise signal is evaluated by a measuring resistor, the ion current signal can be determined. It has been found that a carbon coating forms over the spark plug which can lead to a shunt resistance between the electrodes of the spark plug. When an ion current measurement is to be performed, this shunt resistance has a disturbing influence since, when a DC voltage on the order of several hundred volts is applied as a measuring voltage, the current that flows through this shunt resistance can be of the same order of magnitude as the ion current to be evaluated.

It has been found that the field strength or the polarity of the voltage on the spark plug is not symmetrical. With negative polarity of the glow plug, a much weaker intensity develops than when the polarity of the glow plug is positive. As a result, a measurement signal is obtained in which the input signal is modulated by the ion current that flows due to electrical fields of different magnitudes that form as a function of the polarity of the glow plug. Only an ohmic resistance is formed by the carbon layer, by which the measurement signal is not modulated.

This goal is also achieved by another embodiment of the method according to the invention, in which the applied voltage has an AC component. The operation in this method is explained in the same way as in the first embodiment. The AC component is modulated by the ion current.

In a further advantageous method according to the invention, the measurement signal is evaluated as a voltage across a measuring resistance. This provides a very simple way of detecting the measurement signal.

In another preferred embodiment of the method according to the invention, the ion current signal is obtained with the voltage across the measuring resistance being subjected to low-pass filtration.

It turns out that because of the modulation of the measured signal, caused by the ion current, a comparatively high power density in the ion current signal to be evaluated is obtained at lower frequencies. This signal component can be evaluated by low-pass filtration of the measured signal.

In yet another embodiment of the method according to the invention, the ion component is obtained from the evaluation of the measured capacitance between the electrodes.

The change in dielectric constant is evaluated. The change in the dielectric constant between the electrodes is obtained from the ion density. Therefore, the dielectric constant can be determined from a measurement of the capacitance. Once again, the ion density can be derived from the dielectric constant.

Other objects, advantages and novel features of the present invention will become apparent from the following detailed description of the invention when considered in conjunction with the accompanying drawings.

DETAILED DESCRIPTION OF THE DRAWINGS

Figure 1:
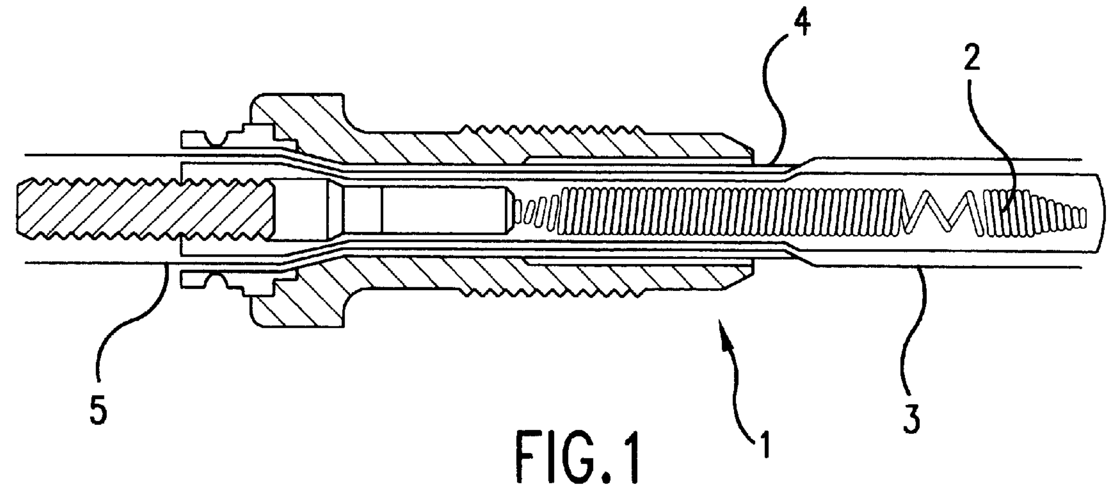
FIG. 1 shows the use of a glow plug as a probe.

FIG. 1 shows the use of a glow plug 1 as a probe. This glow plug 1 has a glow coil 2. To determine the ion component, an ion probe 3 is also provided on glow plug 1. This ion probe 3 consists of a coating insulated from the engine ground by insulation 4. In addition, 5 indicates the connection of the ion probe 3.

Figure 2:
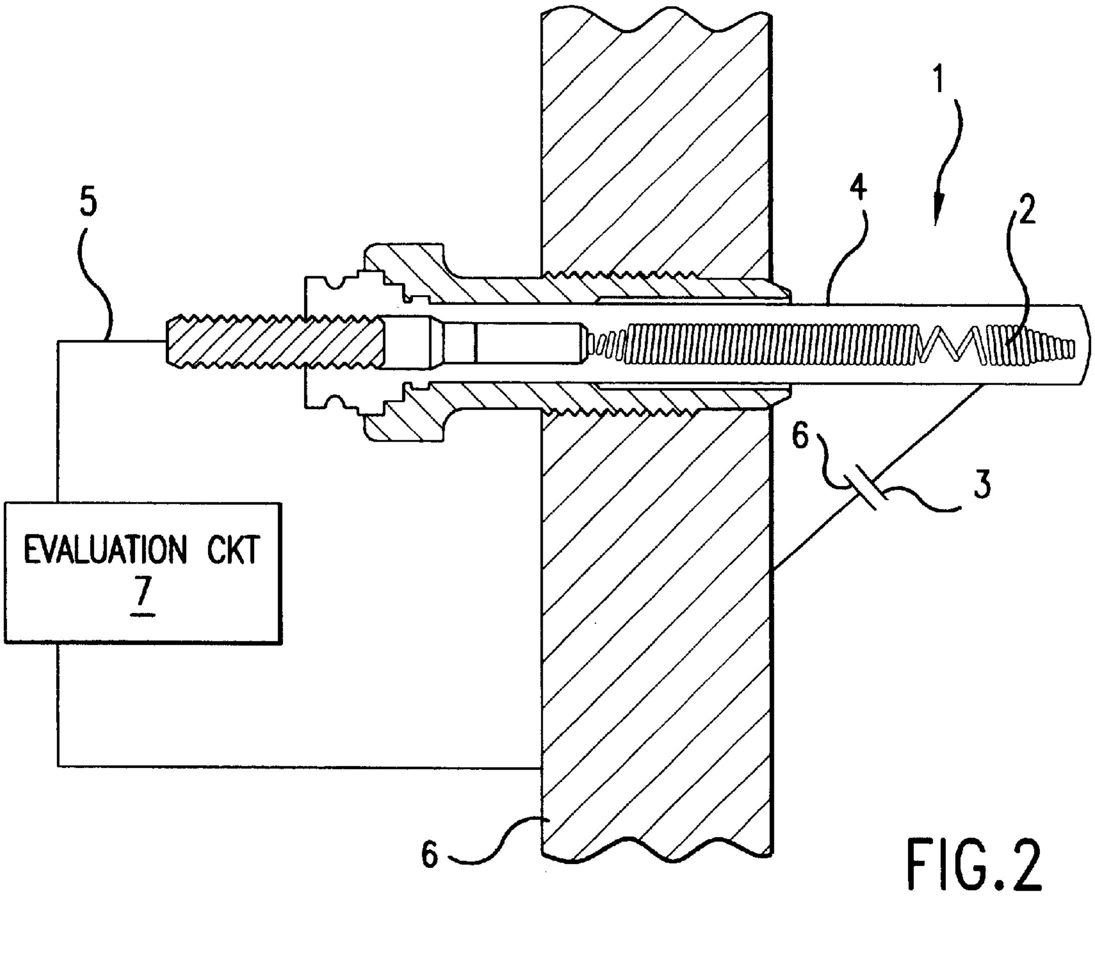
FIG. 2 shows the entire system with a glow plug as the probe.

FIG. 2 shows the entire system with a glow plug 1 as the probe. The insulation 4 shown in FIG. 1 can be seen once again, as well as the glow coil 2 and connection 5. Coating 3 is shown as one electrode of a capacitor. The other electrode is formed by the combustion chamber wall 6. Connection 5 as well as combustion chamber 6 are in contact with an evaluation circuit 7. Instead of the embodiment shown, it is also possible to provide glow coil 2 as one of the electrodes of the capacitor instead of coating 3.

Figure 3:
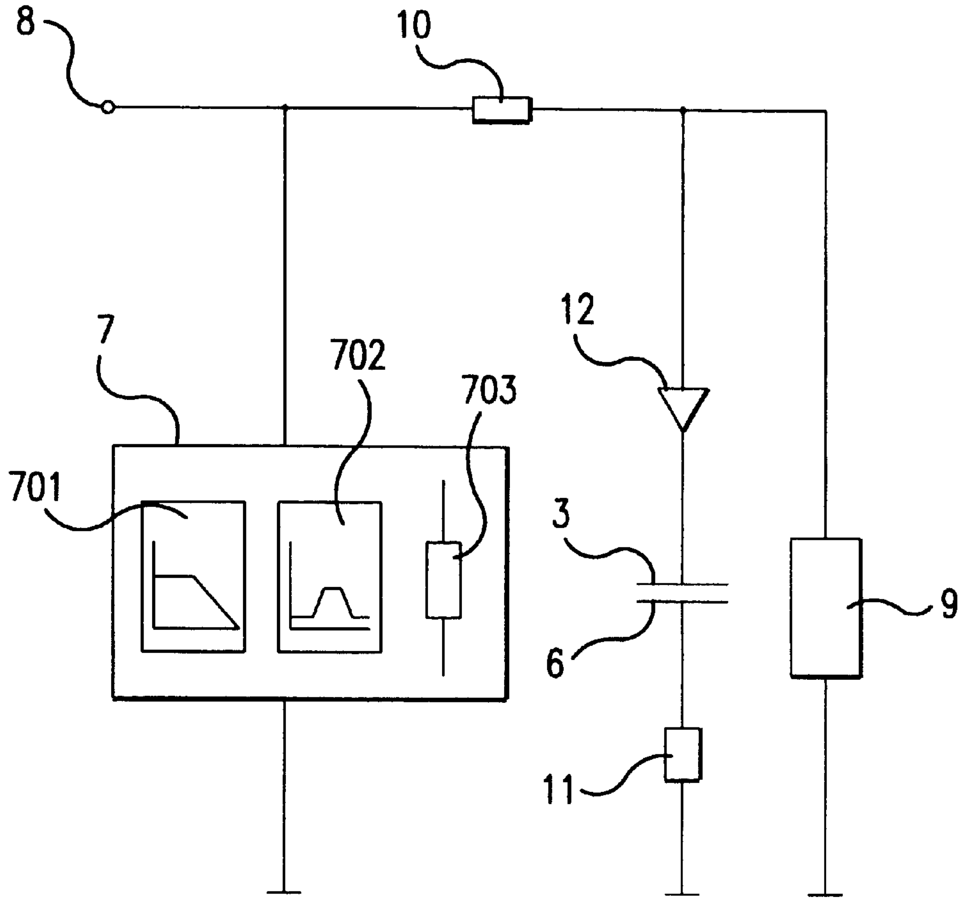
FIG. 3 shows an equivalent circuit.

FIG. 3 shows an equivalent circuit of the entire system according to FIG. 2. The relevant parts of the glow plug are the coating 3 and the combustion chamber wall 6 corresponding to this coating 3. An AC voltage is applied to terminal 8 relative to ground. In the equivalent circuit shown, equivalent resistances are also indicated for the carbon coating, which builds up in a self-igniting internal combustion engine during operation. Equivalent resistance 9 represents the carbon fouling that forms over the glow plug and the combustion chamber wall. This carbon fouling has a finite resistance that also bridges installation 4. When a voltage is applied, current can flow through this resistant section across the coating 3 of the glow plug and the carbon layer to engine ground (combustion chamber wall 6). This resistance 9 is in parallel with the capacitance which once again is formed by coating 3 and combustion chamber wall 6. Equivalent resistances 10 and 11 are also visible which correspond to the carbon fouling of coating 3.

The equivalent circuit in FIG. 3 also shows a diode 12, which, however, is not provided separately but represents the inhomogeneity of the electrical field between the electrodes of the capacitor as a result of the ion component. Under the influence of this diode 12, the AC voltage signal to be evaluated is modulated as a result of the ion component.

In the spark plug of a four-cycle engine, this carbon fouling is burned clean during operation by the arcing between the electrodes of the spark plugs. In a diesel engine, there is no such arcing so that the carbon fouling remains and the equivalent circuit also represents a series connection of a resistor to the individual electrodes of the capacitance.

It has been found that the ion component can be evaluated using evaluation circuit 7. It is important in this connection that an alternating voltage be applied to the entire system. This evaluation circuit consists of a measuring resistance 703. The voltage across this measuring resistance 703 is evaluated in terms of the ion component by a lowpass filter 701. In addition, a bandpass filter 702 can also be provided. This bandpass filter in particular allows frequencies around the frequency of the applied AC voltage to pass. This signal represents carbon fouling.

Figure 4:
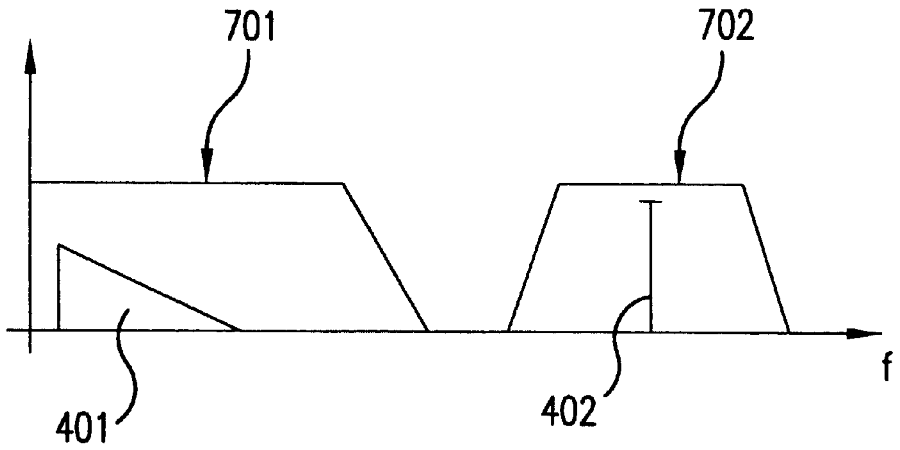
FIG. 4 is a graphical view of the frequency spectrum of the resultant signal.

In a schematic graphical diagram, FIG. 4 shows the frequency band f versus the relative intensity of the signals. On the basis of this diagram, the effect of bandpass filter 702 and lowpass filter 701 can be explained. Lowpass filter 701 filters an ion current signal 401 out of the modulated AC voltage with frequency f. This signal can be evaluated accordingly in order to supply specific parameters for the combustion process. Bandpass filter 702 detects the signal component 402 that results from shunting of the glow plugs.

For example, even during driving, the glow plugs can be heated as a function of the signal component filtered through the bandpass filter in order to "burn clean" the glow plug when necessary.

Alternatively, it is also possible to determine the capacitance between the electrodes 3 and 6. The ion component determines the dielectric constant so there is a direct link between the capacitance and the ion component.

It is also advantageous in that with the method according to the invention, simultaneous heating of the plugs and measurement of the ion current are possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an ion component following a combustion process in a self-igniting combustion engine, comprising the acts of:

positioning a glow plug having a coating which, when said plug is inserted in said engine, is insulated from said engine and wherein said coating functions as a first electrode inside at least one cylinder of the engine wherein a combustion wall chamber of said at least one cylinder forms a second electrode; and applying at least an electrical AC voltage component across said first and second electrodes to determine an ion component within said at least one cylinder.

2. The method according to claim 1, wherein the act of applying at least an electrical AC voltage across the first and second electrode to determine the ion component includes the further acts of:

providing a measuring resistance in parallel with said first and said second electrodes;

obtaining a measurement signal across said measuring resistance; and evaluating said measurement signal to provide an indication of said ion component.

3. The method according to claim 2, further including the act of providing a low-pass filter in parallel with said measuring resistance; and subjecting said at least an electrical AC voltage component across said measuring resistance to said low-pass filter in order to provide an ion current signal.

4. A method for determining an ion component following a combustion process and a self-igniting combustion engine, comprising the acts of:

positioning a first electrode inside at least one cylinder of the engine wherein a combustion wall chamber of said at least one cylinder forms a second electrode;

applying at least an electrical AC voltage component across said first and second electrodes to determine an ion component within said at least one cylinder, wherein the act of applying at least an electrical voltage component to said first and second electrodes to determine the ion component includes the act of measuring a capacitance across said first and second electrodes.

* * * * *